United States Patent [19]
Jureit et al.

[11] 3,892,160
[45] July 1, 1975

[54] CONNECTOR PLATE

[76] Inventors: John Calvin Jureit, 8901 Arvida Ln., Coral Gables, Fla. 33156; Benjamin H. Kushner, 12575 N. Miami Ave., Miami, Fla. 33168

[22] Filed: Apr. 19, 1974

[21] Appl. No.: 462,442

[52] U.S. Cl. ................................. 85/13
[51] Int. Cl. ............................... F16b 15/00
[58] Field of Search...... 85/13, 49; 52/753 L, DIG. 6

[56] References Cited
UNITED STATES PATENTS

| | | | |
|---|---|---|---|
| 3,390,902 | 7/1968 | Jureit | 85/13 X |
| 3,417,651 | 12/1968 | Moehlenpah | 85/13 |
| 3,479,920 | 11/1969 | Sanford | 85/13 |
| 3,633,454 | 1/1972 | Schmitt | 85/13 |

*Primary Examiner*—Ramon S. Britts

[57] ABSTRACT

The connector plate has a plurality of slender nail-like teeth struck to project at right angles to the plate for embedment into adjoining wooden members. The teeth are struck in longitudinal rows with the teeth in each row being staggered longitudinally relative to the teeth of next adjacent rows. The teeth in alternate rows are struck such that the slots left thereby in the plate extend from the teeth in like directions. The teeth in the rows between such alternate rows are formed in longitudinally spaced pairs with each pair of teeth struck to jointly define a slot in the plate, the teeth being located at opposite ends of the slot. These paired teeth are shorter in length than the length of the teeth in adjacent rows and are twisted about their longitudinal axes when struck whereby increased resistance to withdrawal is effected. These short teeth have oppositely scarfed tips to provide a clinching action upon embedment into the wooden members. The tips of the longer teeth in the alternate rows are chisel-pointed providing optimum penetration characteristics upon embedment.

7 Claims, 3 Drawing Figures

CONNECTOR PLATE

The present invention relates to metal connector plates and structural wood joints formed thereby and more particularly to connector plates and joints of the butt-type useful in prefabricated wooden structures such as roof trusses and the like.

The joinder of structural load bearing wooden members has recently and significantly been advanced with the advent of structural wooden joints which are connected solely by means of metal plates having slender elongated nail-like teeth struck therefrom and embedded into the wooden members, such as illustrated in Jureit U.S. Pat. No. 2,877,520. Plates of this type wherein the teeth serve as the only means holding the plates onto the wooden members and the wooden members in adjoining relation and the joints formed thereby have proved eminently successful particularly in the building industry. Various arrangements and configurations of teeth in the plates have been proposed and constructed in the past for specified purposes and to solve particular problems associated with utilization of connector plates of this type in specified woods.

The present invention provides a connector plate which is particularly useful in soft woods, for example Norwegian spruce. It has been found that when conventional connector plates of the foregoing noted type, particularly wherein the teeth are substantially all the same length, are applied to soft wood, the joint fails in tension. That is to say, when the butting wooden members are placed under tensile stresses, the teeth have a tendency to compress the soft wood behind them with the result that the teeth force the formation of significantly larger openings or holes in the wood. The openings in the wood, in effect, spread or enlarge and permit the teeth to bend and slide from the openings. Once the openings for the teeth are enlarged, the resistance to withdrawal of the teeth from the wooden member is significantly decreased with the result that the teeth pull out and the joint fails in tension. It has thus been a problem to effectively employ connector plates of the type having integrally struck teeth projecting to one side thereof in joints wherein the wooden members of the joint are formed of the generally softer woods.

The present invention provides a connector plate which eliminates and/or minimizes the foregoing and other problems associated with prior connector plates and provides a novel and improved connector plate having various advantages in construction, mode of application and result and particularly useful for joining wooden members formed of the softer woods. Particularly, the present invention provides a connector plate having a plurality of slender nail-like teeth struck integrally to project to one side of the plate. The teeth are formed in longitudinally extending rows with the teeth in each row being staggered relative to the teeth of next adjacent rows. The teeth in alternate rows are struck such that the slots left thereby in the plate extend from the teeth in like directions, these teeth being hereinafter referred to as single teeth. The teeth in the rows between the alternate rows thereof are struck in pairs such that a single slot is left in the plate by each such pair, the paired teeth being located at opposite ends of such slot. These latter teeth are hereinafter referred to as double or paired teeth. Each set of paired teeth are laterally adjacent a single tooth whereby the number of paired teeth in each row thereof is substantially twice the number of the teeth in each adjacent row containing the single teeth. The paired teeth are thus slightly greater than one half the length of the single teeth. The paired teeth are twisted about their longitudinal axes when struck and thereby effect increased resistance to withdrawal when embedded into a wooden member. These paired teeth are also provided with oppositely scarfed tips whereby the teeth are deflected laterally upon embedment into the wooden members to clinch the wood strands. The tips of the single teeth are chisel-pointed for optimum penetration characteristics.

A plate constructed as described in the previous paragraph provides increased resistance to tensile forces when applied to the joint formed by two butted wooden members, particularly wherein the wooden members are formed of soft wood. The double teeth in essence take the place of a single tooth and thus provide increased surface area against which the wood bears when the joint is subjected to tensile forces. That is, the critical area at which the tooth tends to enlarge the hole in the wooden members is close to the base of the tooth. By providing a substantial increase in the number of the teeth and hence areas of the teeth against which the wood bears particularly at the bases of the teeth, increased resistance to hole enlargement is provided. Also, by providing paired sets of short teeth uniformly distributed throughout the plate and distributed uniformly among the longer single teeth, the resistance to withdrawal of the teeth from the wooden members is significantly increased particularly at the initial stages of any tendency of the teeth to withdraw. That is, the teeth have optimum or maximum withdrawal resistance when fully embedded. Conversely, the insertion pressure required at the beginning of a press stroke to embed the teeth into the wooden members is initially small with such insertion pressure increasing near the end of the stroke. Consequently, initial tooth penetration is facilitated while accurate location of the plate relative to the joint is assured. Also, the effectiveness of each tooth in the joint is assured by the plate hereof due to the foregoing penetration characteristics. That is, bending of the teeth upon insertion, except when a clinching action is achieved by the paired teeth, is substantially eliminated.

The twisting of the paired teeth when initially struck also increases the resistance to withdrawal of the paired teeth from the wooden member. The generally corkscrew twist of the paired teeth requires removal of additional wood fibers from the wooden member in order to withdraw such paired teeth from the wooden member whereby increased holding power is achieved.

Accordingly, it is a primary object of the present invention to provide a novel and improved connector plate and joint formed thereby.

It is another object of the present invention to provide a novel and improved connector plate particularly useful for joining butted members formed of soft woods.

It is still another object of the present invention to provide a novel and improved connector plate and joint formed thereby wherein the strength of the joint in tension is substantially increased.

It is a further object of the present invention to provide a novel and improved connector plate and joint formed thereby wherein optimum resistance to withdrawal of the plate from the wooden member is provided when the teeth are fully embedded in the wooden members.

It is a still further object of the present invention to provide a novel and improved connector plate and joint formed thereby wherein the plate has an increased number of teeth per square inch.

These and further objects and advantages of the present invention will become more apparent upon reference to the following specification, appended claims and drawings wherein:

Figure 1:
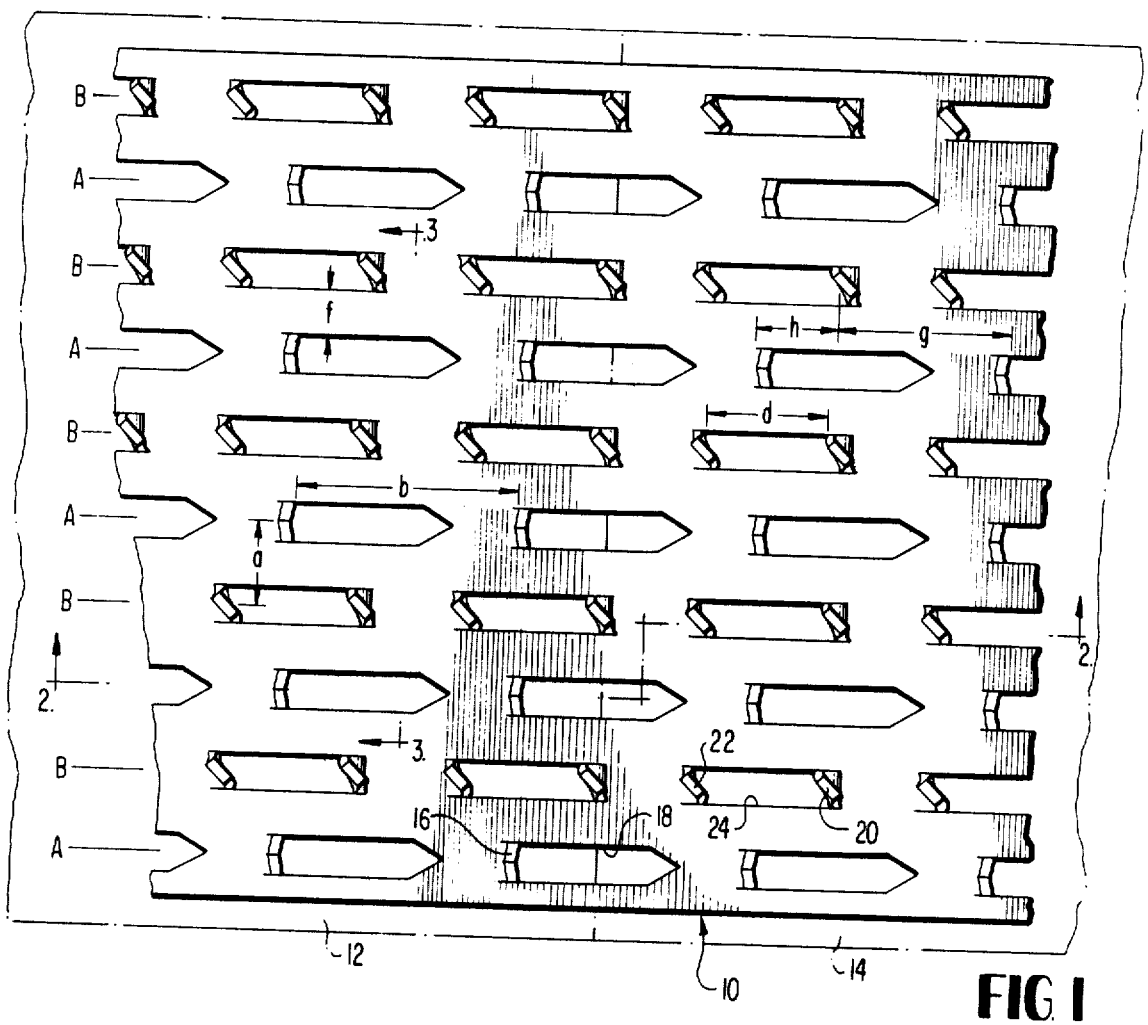
FIG. 1 is a fragmentary plan view of a connector plate constructed in accordance with the present invention viewing the plate from the side to which the teeth project and from within the wooden members of the joint formed thereby.
Figure 3:
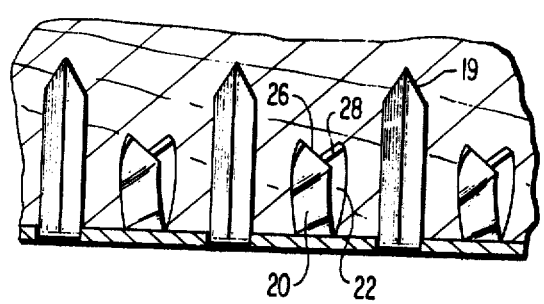
FIG. 3 is a cross-sectional view thereof taken about on lines 3—3 in FIG. 1.

Referring now to the drawings, particularly to FIG. 1, there is illustrated a plate generally designated 10 constructed in accordance with the present invention and illustrated on one side of a pair of wooden members 12 and 14. It will be appreciated that a pair of such plates 10 are provided on the opposite sides of butted wooden members 12 and 14 with the teeth thereof penetrating the wooden members toward one another whereby a secure butt joint between the wooden members is formed. Plate 10 is provided with alternate longitudinally extending rows of teeth 16 struck such that the slots 18 left thereby in the plate extend from teeth 16 in like directions. That is, the alternate rows of teeth designated A are of like configuration and arrangement in the plate. Teeth 16 also lie in transverse alignment one with the other across the plate. As best illustrated in FIG. 3, the teeth 16 are provided with chisel-pointed tips 19 to optimize their penetration into the wooden members. Teeth 16 also have a generally shallow V-shape in cross-section whereby increased column strength is provided. In the rows of teeth designated B and which lie between alternate rows A of teeth 16, there are provided longitudinally spaced teeth 20 and 22 struck in longitudinally spaced pairs thereof. That is, the teeth in each row B are struck to provide longitudinally spaced pairs or doublets of teeth 20 and 22. Each pair of teeth 20 and 22 are struck from the plate to leave a single slot 24 in the plate with the teeth 20 and 22 lying at respective opposite ends of the slot. As best illustrated in FIG. 3, teeth 20 and 22 are struck with tips oppositely scarfed as indicated at 26 and 28 respectively to provide a clinch action upon embedment into a wooden member.

Teeth 20 and 22 are twisted when struck to form a corkscrew configuration of limited axial extent. As illustrated in FIG. 1, the teeth 20 and 22 are twisted in a like direction generally not more than about 45 degrees from their bases to their tips. Also, the teeth 20 and 22 are grooved longitudinally along the base portions thereof whereby a generally shallow V-shaped configuration in cross-section is obtained. The twisting action blends one side of the tooth with the other adjacent the tip portion such that the shallow V groove widens to the extent that the tooth tip portion in cross-section is generally rectilinear. The shallow V-groove is provided for increased column strength. The twisting of teeth 20 and 22, as noted previously, provides increased resistance to withdrawal from the wooden member.

Figure 2:
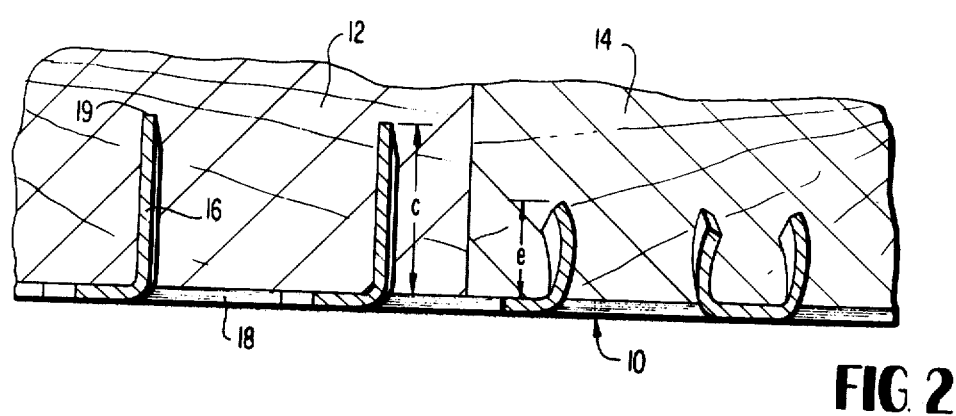
FIG. 2 is a cross-sectional view thereof taken about on lines 2—2 in FIG. 1.

In a preferred from of the plate hereof, the longitudinally extending rows of teeth defined in rows A and B lie on centers equispaced one from the other across the plate and particularly centers 0.28125 inches apart as indicated by the dimension $a$ with the centerline of the rows adjacent the margin of the plate lying 0.1406 inch from the edge of the plate. The teeth in the rows designated A are spaced back-to-back 0.782 inches one from the other as indicated at $b$ and have a length $c$ (FIG. 2) of 0.5505 inches from their tips of the underface of the plate. The spacing d between the opposing faces of the doublets or teeth 20 and 22 is 0.488 inches. The length $e$ of the teeth 20 or 22 from the face of the plate to the tips is 0.312 inches, the tips being scarfed at 45° angles. The distance between the edges of the slots in adjacent rows indicated at $f$ is 0.1562 inches. The distance between the front face of a tooth 16 in row A and the center of a front face of a tooth 22 in the next adjacent row indicated at $g$ in FIG. 1 is 0.5313 inches. The distance $h$ between the front face of tooth 22 and the front face of tooth 16 in the next adjacent row is 0.2507. Each tooth has a width of 0.125 inch. The plate is preferably formed of U.S.S. 18 Gauge galvanized sheet metal having a thickness of 0.0516 inch. The arrangement of teeth disclosed has approximately 6.8 teeth per square inch.

The foregoing described plate has particularly high resistance to withdrawal in the soft woods. This is in part due to the large number of teeth per square inch in the plate and due to the large frontal area presented by the teeth at their base to the wood when subjected to tensile forces.

It will also be appreciated that the teeth in the rows indicated A respectively lie substantially medially between the teeth comprising the sets of teeth in laterally next adjacent rows in order to avoid cutting the wood fibers between the teeth of adjacent rows. Further, the ratio of the length of the teeth in row B to the length of the teeth in row A is (0.312/0.5505) or 0.566 and it has been found that such ratio should be maintained within a range of about 0.5 to 0.7 in order to optimize withdrawal resistance as well as facilitate penetration of the teeth into the wooden members.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A connector plate for joining wooden members one to the other comprising:
  an elongated sheet metal plate, a plurality of elongated nail-like teeth struck from said plate to project to one side thereof, said teeth being struck in longitudinally extending generally parallel rows, the teeth in alternate rows being struck such that the slots left thereby extend from the teeth in like longitudinal directions, the teeth in the rows between said alternate rows being struck to form a plurality of longitudinally spaced sets of two teeth each, the teeth in each set being struck such that a continuous slot is left in said plate between said teeth with the portions of the slot left by each tooth extending therefrom toward the opposite tooth, successive teeth in said alternate rows thereof being spaced longitudinally one from the other and relative to said sets of teeth in next adjacent rows such that each successive tooth lies substantially medially between the pair of teeth forming a set thereof in a next laterally adjacent row of teeth whereby the number of teeth in each said alternate row is substantially one-half the number of teeth in each said next adjacent row, the teeth in said alternate rows thereof being longer in length than the teeth in the next adjacent rows with the latter teeth being approximately 0.5 to 0.7 the length of the former teeth.

2. A connector plate according to claim 1 wherein the pair of teeth in each set thereof have oppositely scarfed tips to provide a clinching action upon embedment into the wooden members.

3. A connector plate according to claim 2 wherein the teeth in said alternate rows have chisel pointed tips.

4. A connector plate according to claim 1 wherein said plate is formed of 18 U.S. Standard Gauge galvanized sheet metal.

5. A connector plate according to claim 1 wherein the pair of teeth in each set thereof are twisted about their respective long axes to increase their resistance to withdrawal upon embedment into the wooden members.

6. A connector plate according to claim 1 wherein the pair of teeth in each set thereof have oppositely scarfed tips to provide a clinching action upon embedment into the wooden members, said pair of teeth in each thereof being twisted about their respective long axes to increase their resistance to withdrawal upon embedment into the wooden members, the teeth in said alternate rows thereof having chisel pointed tips.

7. A connector plate according to claim 1 wherein said teeth are distributed throughout said plate to provide a tooth density of at least six teeth per square inch.

* * * * *

UNITED STATES PATENT OFFICE
CERTIFICATE OF CORRECTION

Patent No. 3,892,160     Dated July 1, 1975

Inventor(s) John Calvin Jureit, and Benjamin H. Kushner

It is certified that error appears in the above-identified patent and that said Letters Patent are hereby corrected as shown below:

Col. 4, line 10, "of the underface" should read --to the underface--.

Col. 4, line 39 "($\frac{0.312}{0.5505}$)" should read -- $\frac{0.312}{0.5505}$ --.

Signed and Sealed this twenty-eight Day of October 1975

[SEAL]

Attest:

RUTH C. MASON
*Attesting Officer*

C. MARSHALL DANN
*Commissioner of Patents and Trademarks*